Oct. 27, 1953  H. W. CLARKE  2,656,946
DISH

Filed June 28, 1947  3 Sheets-Sheet 1

Inventor
HOUGHTON W. CLARKE
By Blair Curtis & Hayward
Attorneys

Oct. 27, 1953     H. W. CLARKE     2,656,946
DISH

Filed June 28, 1947     3 Sheets-Sheet 2

Inventor
HOUGHTON W. CLARKE

Oct. 27, 1953  H. W. CLARKE  2,656,946
DISH

Filed June 28, 1947  3 Sheets-Sheet 3

Inventor
HOUGHTON W. CLARKE
Attorney

Patented Oct. 27, 1953

2,656,946

UNITED STATES PATENT OFFICE 2,656,946

DISH

Houghton W. Clarke, Bronxville, N. Y., assignor of ninety-nine per cent to Mealpack Corporation, Evanston, Ill., a corporation of Illinois Application June 28, 1947, Serial No. 757,841

3 Claims. (Cl. 220—16)

This invention relates to a covered dish for serving prepared meals and to methods of preparing, packing, transporting and storing hot meals.

It is frequently necessary in serving meals of hot and/or chilled foods (including liquids such as soups and beverages, etc., as well as solid foods such as meats, vegetables, puddings, etc.) to prepare the foods and serve them in the dishes a considerable time before they are consumed. When it is desired to provide meals for workers, particularly in mines and large plants, it has frequently been considered impracticable to serve complete meals including hot or chilled foods because of the distances which it is necessary to transport the meals before serving them to the workers.

Accordingly, it is an object of the present invention to provide a dish adapted for serving foods and/or beverages which will be capable of keeping the foods or beverages in perfect condition and without seriously objectionable change of temperature or deterioration in quality while in transport or awaiting transport to the consumer.

Another object of the invention is to provide a dish for serving meals which will be entirely hygienic and preserve foods from contamination.

Another object of the invention is to provide a dish which will be convenient for use either on a table or on one's lap.

Another object of the invention is to provide a dish adapted for ease of transport, particularly for stacking without danger of tipping or slipping from the stack.

Other objects and advantages of the invention will be apparent from the following description and the accompanying drawings.

Although I have shown in these drawings and described in the following specification, a preferred embodiment of my invention and have suggested various modifications thereof, it is to be understood that these are not intended to be exhaustive nor limiting of the invention, but on the contrary, are given for purposes of illustration in order that others skilled in the art may fully understand the invention and the principles thereof and the manner of applying the same in practical use and may be enabled to modify and adapt it in various forms, each as may be best suited to the conditions of a particular use.

Referring now to Figures 1-4, the insulating container there shown is composed of two halves. The lower part $10a$ is made of two shells $11a$ and $13a$ of drawn (e. g. by stamping or spinning) sheet metal, advantageously bright stainless steel sheet. These shells are sealed and locked together by the rubber gasket ring $40a$.

The upper part $15a$ is made in the same way as the two shells $16a$ and $18a$, being also of drawn (e. g. by stamping or spinning) sheet metal, advantageously bright stainless steel. The two shells are sealed and locked together by a gasket $40a$ identical with that described for sealing and holding together the shells $11a$ and $13a$. The space between the shells in both parts is advantageously filled with a thermal insulating material $19a$, e. g. sponge glass, glass wool, wood fiber in loosely formed felt, etc. This insulation is pre-formed to fit the space between the shells so that there will be no excessive packing and to the same end an abutment ring $70a$ is placed in the bottom to limit the relative movement between the shells $11a$—$13a$ or $16a$—$18a$.

In assembling the gaskets, which are made as extruded tubing of the cross-sectional shape shown are cut to proper length with skived ends and these ends cemented and/or vulcanized together to give a ring of the diameter required for the gaskets $40a$. The gasket is applied to the outer ring with the lip $12a$ in the peripheral slot of the gasket. The gasket ring is then rolled outward so as to bring the flange $71a$ beyond the lip $12a$. The inner shell $13a$ is now inserted through the gasket until its lip $72a$ engages the gasket. The latter is then stretched over the lip $72a$ bringing the flange $71a$ against lip $72a$. The shell $13a$ is then pushed down to the position shown in Figure 4. As lip 72a passes lip 12a the gasket 40a is compressed tightly together and as it passes beyond the gasket, expands again. Thus, its resilient expansive force serves to hold the parts securely together. Advantageously, this assembly is performed in partial vacuum or the space between the shells is evacuated by means of a hypodermic needle inserted through the gasket.

Figure 1:
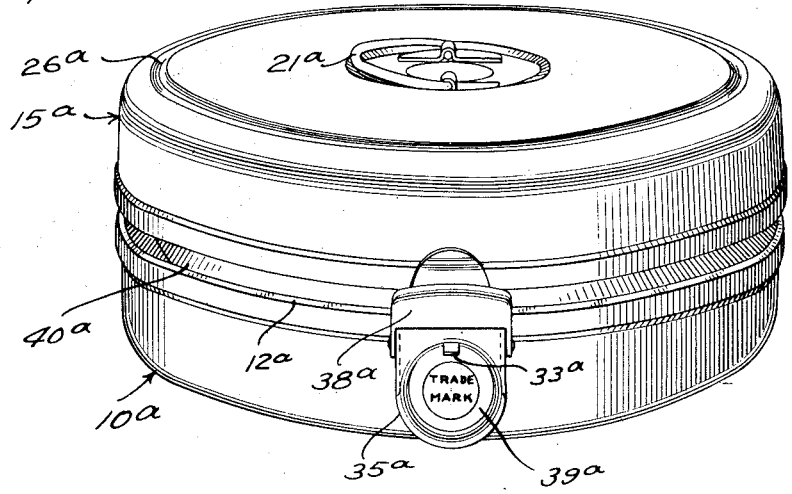
Figure 1 is a perspective view from the front of a structure embodying my invention.
Figure 2:
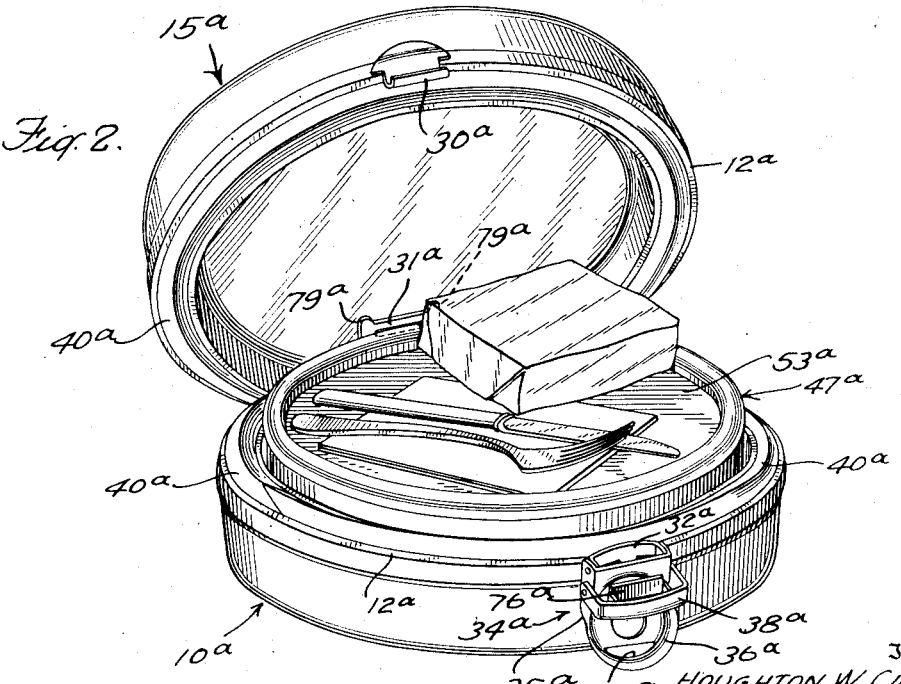
Figure 2 is a perspective view of the container of Figure 1 opened, but with the foods still sealed therein.

The upper part 15a, in the embodiment shown in Figures 1-2, is similar in form and construction to the lower except that instead of the annular projection 27a on the bottom an annular recess 23a is formed in the top adapted to interfit with 27a for stacking of containers for use of the cover as a table or lap tray, as described above. The use of a deep cover as shown in these figures is an advantage in that it raises the dish to a level above the lap more convenient for eating. The projection 27a is made with just a little smaller diameter than that of the gaskets 40a so that the cover and body are held aligned whether the cover is used right side up or inverted. The projection 27a, whether annular as shown or of different form, is rounded on the bottom so that it will make only tangential contact with any ordinary supporting surface on which it may be placed. Thus, heat loss by conduction is minimized.

A handle bail 21a may be provided on the top if desired.

It will be observed that in this embodiment all surfaces are smooth, easily washed and sterilized, and as described are thermally reflective and of low thermal conductivity stainless steel sheet. The rubber gaskets seal the space between the shells so that its thermal insulating quality is not impaired by moisture and there is no danger of unsanitary accumulations of food residues or soap being carried therein during washing. The container is rugged and fool-proof and withstands much abuse, as well as all normal use under widely varied conditions.

Figure 3:
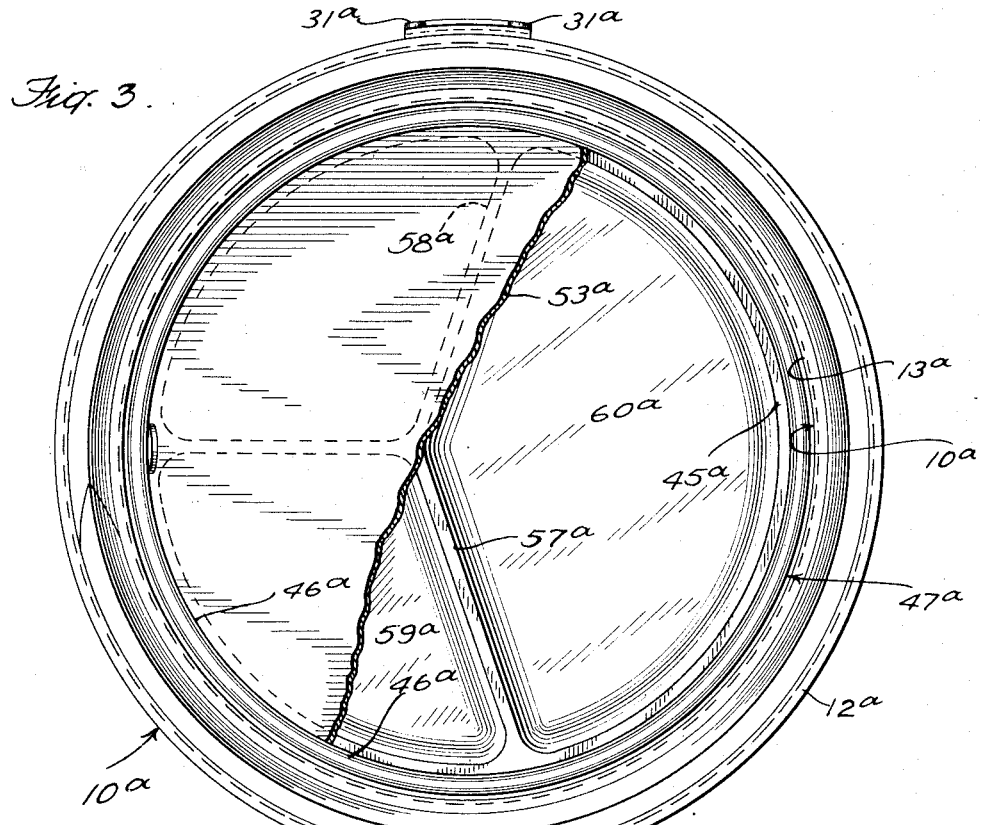
Figure 3 is a plan view of the dish of Figure 2.

In Figures 2 and 3 I have shown a dish 47a divided by partitions 57a into receptacles 58a, 59a and 60a. The dish 47a is made of a material of low coefficient of thermal expansion, such that with the particular dish, the smooth contact line on which it is engaged and sealed by the removable lid 53a is not substantially distorted so as to impair the seal by normal use and handling of the dish. I have found the best material for this purpose is oven glass, such as the borosilicate glass generally known as Pyrex, which has a low coefficient of thermal expansion (about $36 \times 10^{-7}$) and can be rapidly heated to and cooled from about 200° F. in one part (e. g. by putting hot food in only one compartment) without the precaution of uniformly heating throughout and without cracking or appreciable distortion of the smooth sealing line. Moreover, with such glass, dishes can be accurately formed to predetermined dimensions with no distortion of the sealing line during manufacture, so that disposable lids formed with standard dies can be used interchangeably in any dish made from the same mold. Other materials such as the more refractory plastics, stainless steel, etc. can be used provided that they meet these requirements as to accuracy of manufacture and stability during use. Ordinarily, the total dimensional change from the time of forming until they are ready for use should not exceed 0.1% on any dimension and should be substantially the same on all dimensions.

As shown in Figure 2 the dish 47a is of circular form and of dimensions adapted to substantially fill the interior of the lower or body portion 10a but leaving a small clearance or air space to avoid direct thermal conduction to the shell 13a. On the bottom of the dish are low rounded protuberances, or feet, which make tangential contact with the floor of the shell 13a. These feet are not shown in Figure 2 but are shown at 74b in Figure 4. The outer rim 46a of dish 47a is rounded and projects beyond the rest of the dish so that the sides of the dish can never make more than tangential contact with the sides of the shells 13a and 18a.

On the inside of the dish 47a, the upper edge is enlarged and flared slightly outward for the reception of a sealing disc 53a of special cardboard or similar material, as already described above; and, in the embodiment shown in Figure 3, an integral partition 57a extends from three points on the wall to near the center and to the height of the disc 53a, thus dividing the interior into three compartments. The top of this partition and the peripheral ledge 45a make a smooth continuous line of contact so that when the movable cover 53a is pressed into position it not only makes effective contact, with resilient pressure, against the periphery of the upper wall portion 46a but also makes a full and continuous sealing contact with the upper surface of the ledge 45a and of the partition 57a. The disc 53a is made slightly larger than the inner periphery of the upper wall portion 46a, so that when pressed down against the ledge 45a it is radially compressed. This results both in an edge seal and a tendency to buckle the disc to a dome-shape, either up or down. Advantageously the upper edge of partition 57a lies in such a dome-surface but less concave or more convex than that produced by free buckling of the disc. The disc 53a is pressed into place by a ram or other tool having its pressing face a little more concave or less convex than the domed surface to which the tops of partition 57a are formed. By this means the peripheral edge of the disc is pressed down smoothly against the ledge 45a and the rest of the disc is domed and pressed by its own resiliency against partition 57a. If the partition 57a is domed down toward the center, the resilient pressure of the buckled disc 53a holds the initial seal; whereas if the edges of 57a are domed upward the initial seal is held by the frictional engagement at the edge 46a and a tensile stress on the disc. Thus it will be seen that there is advantage in having the sealing edges 57a domed downward from the periphery if compartments are to be sealed from one another at the outset. It is also permissible to use a reverse curve, i. e. domed downward for a part or parts of the radius and upward in another part or parts.

Since the covers 53a are normally put into position and pressed home while the dish and its contents are hot, and then exposed to a cooler atmosphere, a slight vacuum is quickly created within the container by which the lid 53a is pulled down and held in pressed sealing relation even if the initial seal was not effective to seal the compartments one from another. This vacuum increases as cooling continues slowly during storage and transport of the packed meal.

The lip or upper rim 46a extends sufficiently above the cover disc 53a so as to surround a space on which tableware, bread, pastries, etc., may be placed and to hold them against sliding off if the dish is tipped with the container open.

Disc 53a is advantageously of cardboard laminated and bonded to aluminum foil (or other metal foil) on the side which is exposed to the contents of the dish. Its other side is printed with appropriate indicia indicating for example, the nature of the contents and/or carrying advertising matter or instructions. The upper surface of the card is advantageously not made impervious. It has been found that the presence of the fibre helps to maintain desired atmospheric conditions within the container.

At spaced points the body portions 10a and lid 15a are provided with connections adapted for clamping these parts together in sealed relation. A particularly advantageous connection is shown in which the lid 15a is provided at diametrically opposite points with hooks 30a, best shown in Figure 4. The body portion is provided at the back with a hinge member 31a best shown at the back of Figure 2, and at its front with a clamping member 34a shown in Figures 8, 9, 10, 11 and 12.

Figure 4:
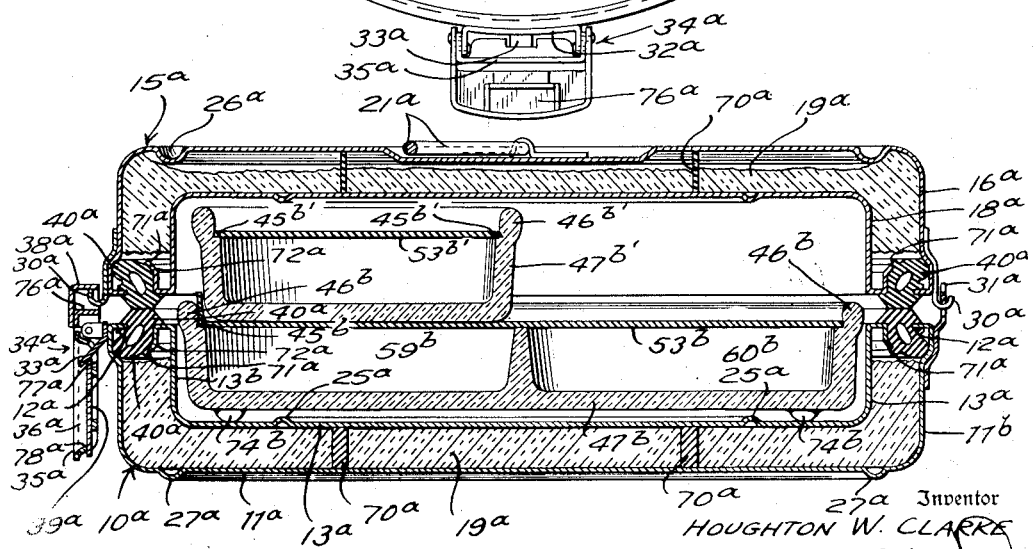
Figure 4 is a view in vertical axial section through the container of Figure 1, but with different receptacles.

Referring to Figure 4 it will be seen that this clamping member 34a is composed of three parts pivoted together to form a toggle. A U-shaped part is secured (e. g., by spot welding) to the body 10a. A lever part 35a is pivoted to the arms of the U and on an axis spaced beyond this the clamping head 38a is pivoted to the lever part 35a. This part 38a is formed with a mouth 76a so that it can act in either direction on hook 30a. When the toggle is pulled down the hook 30a is engaged at the top of mouth 76a to pull the lid 15a down onto the body 10a and compress the gasket 40a. When the container is to be opened the lever 35a is swung outward and upward lifting the mouth portion 76a which then engages the hook 30a to lift the lid 15a against the vacuum which has been established therein by cooling.

A projection 33a on the part 32a projects diagonally downward through an opening 77a in lever 35a and across the bottom periphery of a depressed recess 36a in 35a so as to secure the edge of a paper disc seal 39a between it and the part 35a. At the opposite side of recess 36a its bottom is cut out so that the remaining edge 78a engages the disc 39a and prevents its removal except by defacing or destruction. When the lever part 35a is pulled up to release the lid, it shears the disc 39a between the projection 33a and the sides of the opening 77a, thus giving clear indication that the container has been opened. So long as the disc remains in place and intact, it shows that the contents are fresh and have not been tampered with.

The hinge member 31a, as best shown in Figure 2, is provided with a slot adapted to receive the hook 30a. This slot is positioned so that when the lid 15a is swung down toward body portion 10a with the hook 30a in the slot, the gaskets 40a of the two portions will be brought together ridge to ridge and compressed against one another.

The top of the hinge member 31a is formed with rounded ears 79a at each side which serve as guides for the hook 30a. When the parts are to be assembled they are first brought together in perpendicular relation and the shank of the hook 30a dropped onto the top of the hinge member 31a between the ears 79a. The slot is just far enough below the top so that in this position the hook 30a slides readily into the slot. The ears 79a are just high enough to engage the edge of the shell 16a so that when the lid is swung down toward the body portion these ears pry the hook into the slot, but they are short enough so that, once the hook is in the slot the lid can readily slide over them. This self-aligning hinge device and the use of identical hooks 30a at opposite sides of the container adapted to serve either in the hinge or the clamp, greatly facilitates the assembly and closing of containers and thus saves materially in the cost of packing meals.

In the use of this container as described above, a dish 47a is advantageously first pre-heated to or slightly above, a temperature at which food to be placed therein would continue to cook. Ordinarily about 160–170° F. will be found most satisfactory but this may be varied depending on conditions. The foods are then separately cooked, either to completion or just short of completion and the several compartments 58a, 59a, and 60a are filled substantially with individual servings of these foods while the temperatures of both the dish and the foods are at least slightly above the temperature at which cooking will continue. These foods are taken immediately from the cooking operation without any more delay than is necessary for the transfer; or if convenient, one or more of the foods may be actually cooked in the dish, especially where casserole foods are to be served.

As soon as the several foods are filled into their respective compartments, and after making sure that the upper surfaces of the peripheral ledge 45a and of the partition 57a are clean, a lid 53a is pressed into position, using a ram which assures uniform pressure all around the peripheral edge as the lid, which is slightly larger than the opening, is radially compressed while it is pushed down over the inclined lip 46a and onto the ledge 45a. Napkins and tableware are then placed on top of the lid 53a and beside them bread or rolls wrapped in a moisture proof wrapping and, for example, a piece of pie, likewise wrapped in a moisture proof wrapping. The cover section 15a is then put into position, engaging the projection 30a under the self-centering hinge member 31a and then engaging the projection 33a under the toggle clamping member 34a, and the latter is then snapped down so as to clamp the members together and compress the gaskets into an air tight seal. Finally a paper disc or seal 39a is inserted into the recess 36a under projection 33a and pushed down until its opposite edge snaps under the edge 78a.

Ordinarily I do not preheat the container 10a—15a and consequently the cooling of the dish 47a and its contents continues for a short time after the container is closed and until its inner shell 13a and 18a has been heated to a temperature approaching that of the dish 47a. This has the effect of increasing the suction by thermal contraction within the container, together with some degree of condensation of moisture. Simultaneously there occurs some thermal expansion of the air within the container and external to the dish, which further assures that the seal will be maintained not only between the interior and exterior of the dish, but between the several compartments of the dish; and thus no exchange of flavors can occur.

Because the dish is packed at high temperature, the foods quickly surround themselves with an atmosphere primarily of water vapor, and by reason of the quick and efficient sealing of the several compartments, each of which is largely filled with food, very little oxygen is entrapped. It has been shown that foods are kept in the container without substantial loss of flavors or of vitamin values such as would occur with a very much shorter holding time on a steam table or even in a serving dish as used for serving foods in the home.

Figure 4 shows an arrangement embodying substantially the same invention, but in addition shows how several dishes can be piled one on another in the container. In this case, a compartment dish 47b is used substantially the same as dish 47a excepting that it is in this case shallower with respect to the height of the container section 11b, 13b. This dish 47b contains the several items of the main course of the dinner in the respective compartments 59b, 60b, etc. At one side of and on top of, the cover 53b of the main course dish has been placed a semicircular dish 47b'. This like the dish 47b is provided with an upper lip 46b' like the lip 46b, and a ledge 45b' which respectively engage the periphery and under edge of the disposable cover 53b' but in this case there are no partitions within the dish. This dish may contain a suitable serving of soup or a pudding or other items of the meal.

The utensils etc. in this case are placed at the right of the dish 47b'. If desired, a beverage cup may be used instead of or in addition to the dish 47b' or this dish may be divided by a partition; or several such dishes may be placed one beside the other. It will likewise be appreciated that if deeper or additional dishes are desired, the thermal insulating container 10a—15a can be made of appropriate depth to receive them.

Figure 5:
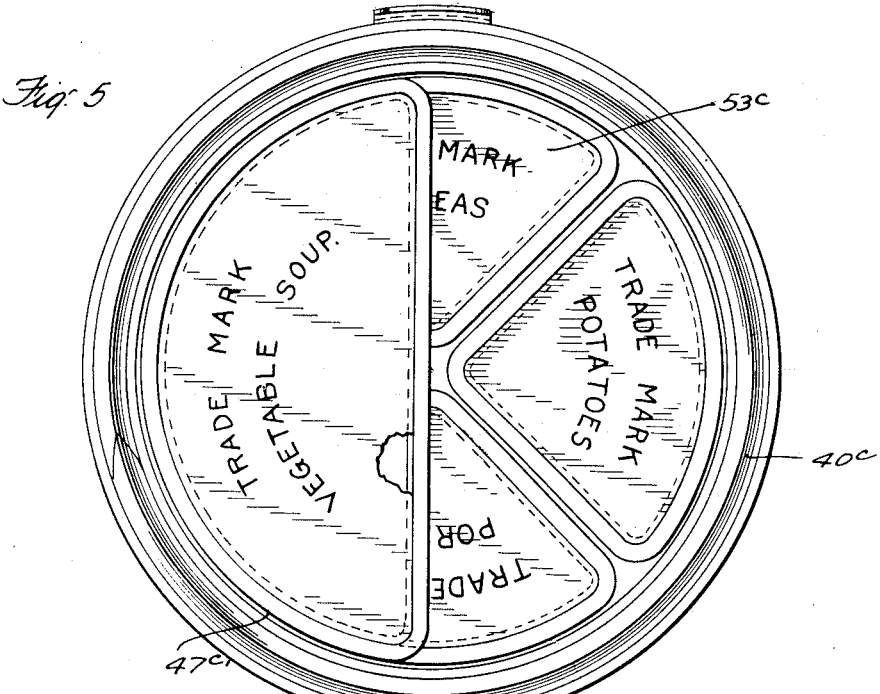
Figure 5 is a plan view similar to Figure 3 but showing the receptacles of Figure 4.

In Figure 5 is shown another alternative. In this case a semicircular container 47c' identical with that shown at 47b' in Figure 11, is used; but instead of the partitioned dish 47b, I have shown in Figure 5 a series of individual dishes made more or less pie-shaped in outline so that they fit together within the container.

Figure 6:
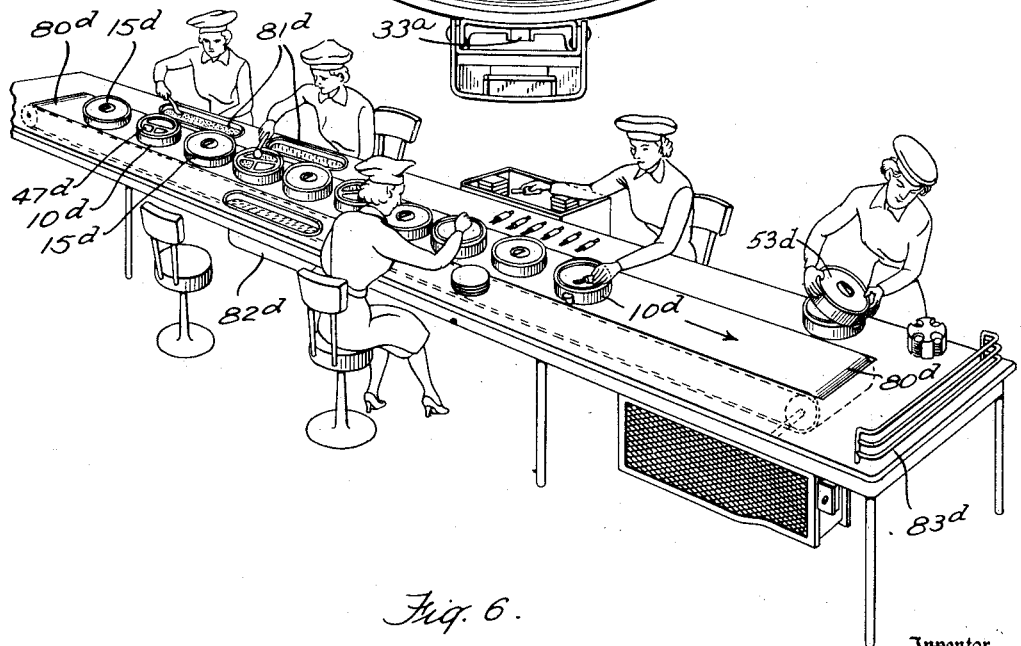
Figure 6 is an isometric view of a packing table and conveyor used in my invention.

In Figure 6 is shown a conveyor table which is advantageously used to assure accurate temperature control. The container bodies 10d and lids 15d at room temperature are fed alternately onto conveyor belt 80d and a dish 47d pre-heated to 170° F. is immediately placed in the body 10d The foods are supplied in special cooking dishes 81d which facilitate rapid serving and of relatively small capacity so that exposure during serving is minimized. These ordinarily hold their temperature approximately without further precaution than avoidance of delays after cooking, but if desired electrically heated thermostatically controlled wells 82d may be provided on the table 83d for holding the dishes 81d. The cover discs 53d are applied as soon as the several foods have been served from the dishes 81d into dishes 47d, all without stopping the belt 80d or removing the container from it. Immediately wrapped breads, pastries etc. and utensils, napkins, etc. are laid on the cover disc and the lid 15d then placed and clamped.

The belt 80d runs at a fixed speed predetermined to complete these operations within a definitely fixed period. The atmospheric conditions are known and kept reasonably stable and the temperatures at which the dishes and foods and containers, utensils, etc. are supplied is known. Thus, by relating these factors the heat in the container as it is closed is definitely predetermined.

I claim:

1. A device for transporting and serving hot meals, which comprises a heat-insulated, hollow body composed of separable sections adapted to be secured together in sealing relation, a dish in the interior of said body facing upwardly and equipped with at least one partition providing a plurality of compartments adapted to receive hot foods, said dish being provided about its upper periphery and on the inside thereof with a shelf in general horizontal alignment with the top of said partition, and a thin, flexible cover lid tightly seated upon said shelf and with its edge portion abutting the side wall of said dish, said lid being formed of fibrous material and having moisture-pervious fiber edges abutting said side wall and forming, when saturated with water moisture, an airtight seal therewith, and a moisture-impervious coating on the bottom of said lid, whereby the vapors from said foods passing around the edge of said lid saturate said fibrous edge and seal the same against the dish and upon the cooling of the food said flexing lid is drawn down tightly into self-sealing engagement with the top of said partition to separate the food-containing compartments.

2. A device for transporting and serving prepared meals, which comprises a heat-insulated, hollow body composed of separable sections adapted to be secured together in sealing relation, the lower section thereof providing a container adapted to receive hot foods, a partition dividing said container into a plurality of compartments, said container being provided around its upper periphery and on the inside thereof with a shelf in general horizontal alignment with the top of said partition, and a thin, flexible cover lid having its peripheral portions resting upon said shelf and its edges tightly abutting the side wall of said container, said lid being formed of moisture-pervious material and having its fibrous edges, when saturated with moisture from the foods, forming a seal with the side wall of the container, and a moisture-impervious coating covering all of the bottom of said lid except for the edge fibrous portion against the side wall of the container, whereby upon the sealing of the edges of said lid against the side wall of the container and upon the cooling of said foods, a vacuum is formed and said lid is drawn downwardly into sealing engagement with the top of said partition to seal apart said food compartments.

3. A dish for transporting and serving prepared foods, which comprises a heat-insulated, hollow body composed of separable sections adapted to be secured together in sealing relation, a dish on the interior of said body having an open top and provided with at least one partition providing a plurality of compartments therein adapted to receive hot foods, said dish being provided about its upper periphery and on the inside thereof with a shelf in horizontal alignment with the top of said partition, a thin, flexible cover lid having its edge portions resting upon said shelf and engaging the side wall of said dish in tight engagement therewith, said disc being of fibrous and moistureproof material with its fibrous edges engaging the side wall of said dish to form, when saturated with vapor-moisture from the foods, a seal therewith, and a coating of impervious, reflective metal covering all of the bottom of said lid except at the fibrous edges thereof, whereby the vapors from said foods passing about the edge of said lid saturate said fibrous edges and seal the same against the dish and upon the cooling of the food said flexing lid is drawn tightly into said self-sealing engagement with the top of the partition to separate the food-containing compartments.

HOUGHTON W. CLARKE.

References Cited in the file of this patent

UNITED STATES PATENTS

| Number | Name | Date |
|---|---|---|
| 42,535 | Jackson | Apr. 26, 1864 |
| 124,459 | Thurston | Mar. 12, 1872 |
| 770,528 | Kestner | Sept. 20, 1904 |
| 798,244 | Wilmore | Aug. 29, 1905 |
| 825,177 | Bales | July 3, 1906 |
| 966,264 | Sultzbaugh | Aug. 2, 1910 |
| 1,336,776 | Drinkwater | Apr. 13, 1920 |
| 1,399,270 | Musbaum | Dec. 6, 1921 |
| 1,408,256 | Boehl | Feb. 28, 1922 |
| 1,510,103 | Perkins | Sept. 30, 1924 |
| 1,582,338 | Lopez et al. | Apr. 27, 1926 |
| 1,640,860 | Sutter | Aug. 30, 1927 |
| 1,677,276 | Deicken | July 17, 1928 |
| 1,677,593 | McEwan | July 17, 1928 |
| 1,711,115 | Johnson | Apr. 30, 1929 |
| 1,730,403 | Boland | Oct. 8, 1929 |
| 1,761,483 | McGinnis | June 3, 1930 |
| 1,831,663 | Hill | Nov. 10, 1931 |
| 1,881,873 | Newcomb | Oct. 11, 1932 |
| 1,885,757 | Orlopp | Nov. 1, 1932 |
| 1,889,111 | Serr | Nov. 29, 1932 |
| 1,953,585 | Brown | Apr. 3, 1934 |
| 1,956,395 | Montgomery | Apr. 24, 1934 |
| 2,096,825 | Roman | Oct. 26, 1937 |
| 2,102,208 | Kronquest | Dec. 14, 1937 |
| 2,108,114 | Foard | Feb. 15, 1938 |
| 2,211,816 | Heise | Aug. 20, 1940 |
| 2,256,764 | Scott | Sept. 23, 1941 |
| 2,271,156 | Walker | Jan. 27, 1942 |
| 2,339,555 | Glass | Jan. 18, 1944 |
| 2,339,580 | Park | Jan. 18, 1944 |
| 2,349,099 | Kircher | May 16, 1944 |
| 2,375,088 | Doran | May 1, 1945 |
| 2,405,764 | Smith | Aug. 13, 1946 |
| 2,425,963 | Silva | Aug. 19, 1947 |
| 2,465,910 | Mills | Mar. 29, 1949 |

FOREIGN PATENTS

| Number | Country | Date |
|---|---|---|
| 9,058 | Great Britain | Sept. 22, 1910 |